(12) United States Patent
Skunberg et al.

(10) Patent No.: US 7,694,279 B2
(45) Date of Patent: Apr. 6, 2010

(54) EXTENSIBLE WEB SERVICE

(75) Inventors: Mark Skunberg, Moorhead, MN (US); William F. Pfingsten, Davenport, ND (US); Michael V. Lee, Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 1014 days.

(21) Appl. No.: 11/363,126

(22) Filed: Feb. 27, 2006

(65) Prior Publication Data

US 2007/0203721 A1    Aug. 30, 2007

(51) Int. Cl.
*G06F 9/44* (2006.01)
(52) U.S. Cl. ............... 717/126; 717/104; 717/116
(58) Field of Classification Search .......... 717/100, 717/101, 104, 108, 116, 126, 136; 707/104
See application file for complete search history.

(56) References Cited

U.S. PATENT DOCUMENTS

| | | | | |
|---|---|---|---|---|
| 5,790,789 | A * | 8/1998 | Suarez | 709/202 |
| 5,845,289 | A | 12/1998 | Baumeister et al. | |
| 6,336,211 | B1 * | 1/2002 | Soe | 717/108 |
| 6,442,620 | B1 * | 8/2002 | Thatte et al. | 719/316 |
| 6,745,388 | B1 | 6/2004 | Gupta et al. | |
| 6,779,184 | B1 | 8/2004 | Puri et al. | |
| 6,789,252 | B1 * | 9/2004 | Burke et al. | 717/100 |
| 6,901,595 | B2 | 5/2005 | Mukundan et al. | |
| 7,072,934 | B2 * | 7/2006 | Helgeson et al. | 709/203 |
| 7,197,512 | B2 * | 3/2007 | Pharies et al. | 707/103 R |
| 2001/0047385 | A1 * | 11/2001 | Tuatini | 709/203 |
| 2002/0023261 | A1 * | 2/2002 | Goodwin et al. | 717/146 |
| 2002/0165903 | A1 * | 11/2002 | Zargham et al. | 709/202 |
| 2003/0167229 | A1 | 9/2003 | Ludwig et al. | |
| 2003/0182452 | A1 * | 9/2003 | Upton | 709/246 |
| 2003/0233477 | A1 * | 12/2003 | Ballinger et al. | 709/246 |
| 2004/0093581 | A1 | 5/2004 | Nielsen et al. | |
| 2004/0186764 | A1 | 9/2004 | McNeill | |
| 2005/0015619 | A1 * | 1/2005 | Lee | 713/201 |
| 2005/0132276 | A1 * | 6/2005 | Panditharadhya et al. | 715/513 |
| 2005/0166187 | A1 | 7/2005 | Das et al. | |
| 2005/0203956 | A1 | 9/2005 | Dweck et al. | |
| 2006/0101445 | A1 * | 5/2006 | Carbajales et al. | 717/165 |

FOREIGN PATENT DOCUMENTS

| | | |
|---|---|---|
| EP | 1376337 | 1/2004 |
| EP | 1594049 | 11/2005 |

OTHER PUBLICATIONS

Dare Obasanjo, XML Serialization in the .NET Framework, Jan. 23, 2003, Microsoft Corp. (Dare Obasanjo.pdf).*

Evangelos Petroutsos, Store and Retrieve XML-based Business Object with SQL server and .NET, Aug. 20, 2003, Jupitermedia Corp. (Evangelos Petroutsos.pdf).*

(Continued)

*Primary Examiner*—Hiren Patel
(74) *Attorney, Agent, or Firm*—Marshall, Gerstein & Borun LLP

(57) ABSTRACT

In order to make business software operate remotely as a web service, the web service may have to be extendible. This extendibility may require several additions to the base software that is now operating as a web service program.

14 Claims, 6 Drawing Sheets

OTHER PUBLICATIONS

Dare Obasanjo, Designing Extensible, Versionable XML Formats, Jul. 15, 2004, Microsoft Corp. (Extreme XML.pdf).*

Williams, et al., "Enabling Adaptive Enterprise Services Oriented Architectures with Distributed Object-Oriented Middleware," http://www.cs.ucf.edu/~ceh/Papers/EnablingAdaptiveEnterpriseCIC2002%2005032002.pdf.

Karastoyanova et al., "Extending Web Service Flow Models to Provide for Adaptability," http://www.informatik.tu-darmstadt.de/GK/participants/dimka/Publications/WS-flow-Adaptability-OOPSLA04.pdf.

Piccinelli et al., "Service-oriented Modelling for e-Business Applications Components," IEEE 2001, http://ieeexplore.ieee.org/search/wrapper.jsp?arnumber=953379.

Kreger, "Web Services Conceptual Architecture," IBM Corporation May 2001, http://josquin.cti.depaul.edu/~rburke/courses/f01/isds554/readings/WSCA.pdf.

Gamma et al., "Design Patterns: Elements of Reusable Object-Oriented Software," Addison Wesley Longman, Inc. 1995, pp. 315-323.

* cited by examiner

EXTENSIBLE WEB SERVICE

BACKGROUND

A web service contract is a long term agreement that allows consumers to interact with a web service. These contracts are intended to be backwards compatible, allowing the service and the consumers to evolve on different schedules. Today's service designers typically add new elements to their schema by changing the source code, adding the required business logic and rebuilding the service. This approach works for simple services.

SUMMARY

Business applications are large complex systems that typically require customizations to fit specific industries, countries, and customers. Exposing business applications as web a service is difficult because they have to be able to be customized over time and these customizations must work for all consumers, even consumers that have made changes to the application. It is not feasible to release source code to every service variation. To address this issue, the service has to be designed to be extensible.

In order to make a service extensible, several steps may be taken. For example, the schemas for business objects may need to be designed as extensible, the schema for the business object and its extensions may need to be serialized and de-serialized independently, an event model may be created to allow subscribers to listen to business events, the business logic may be put into a series of strategies that are subscribers to the business events and the strategies may be late bound so they may be configured.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
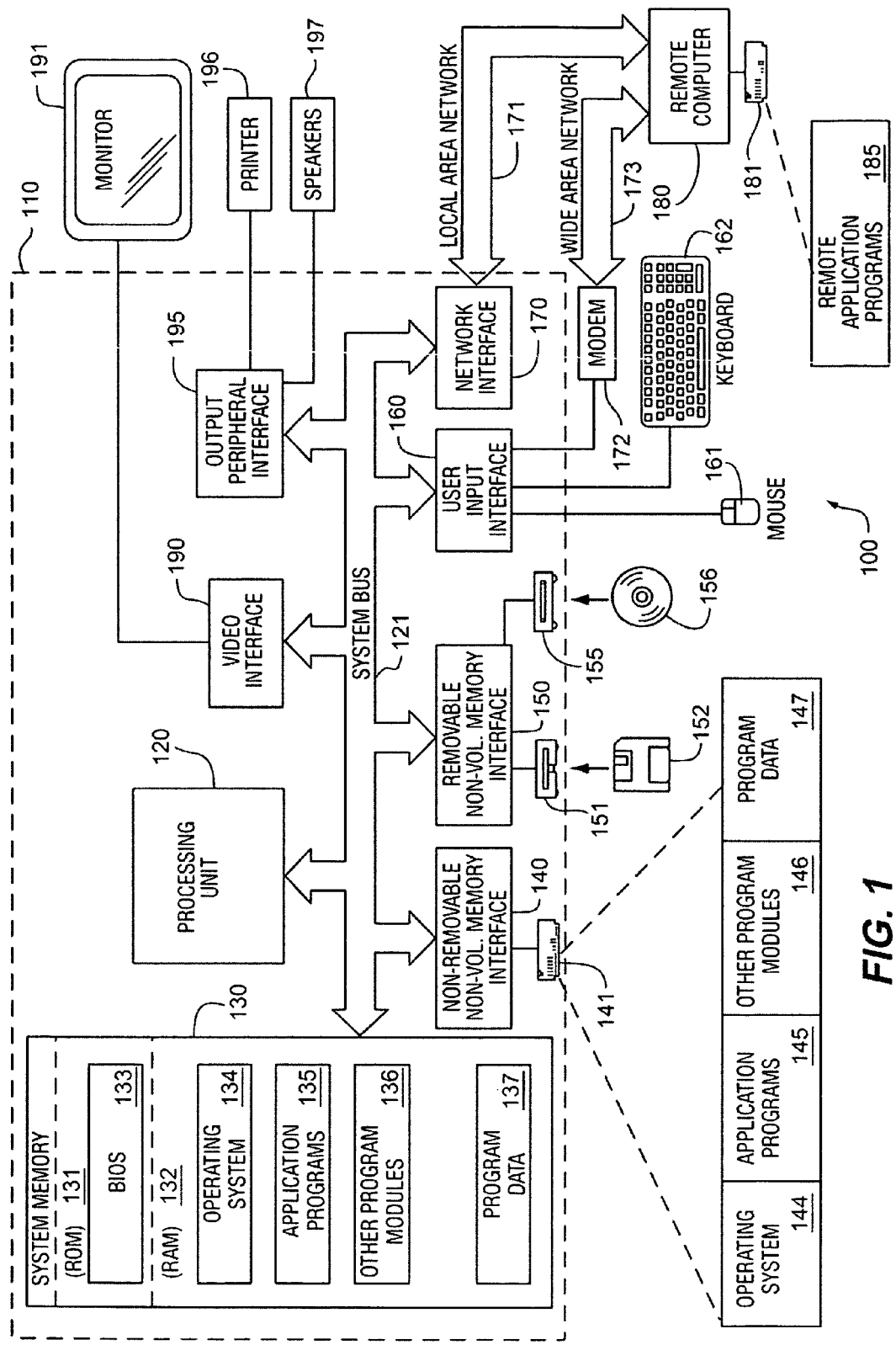
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
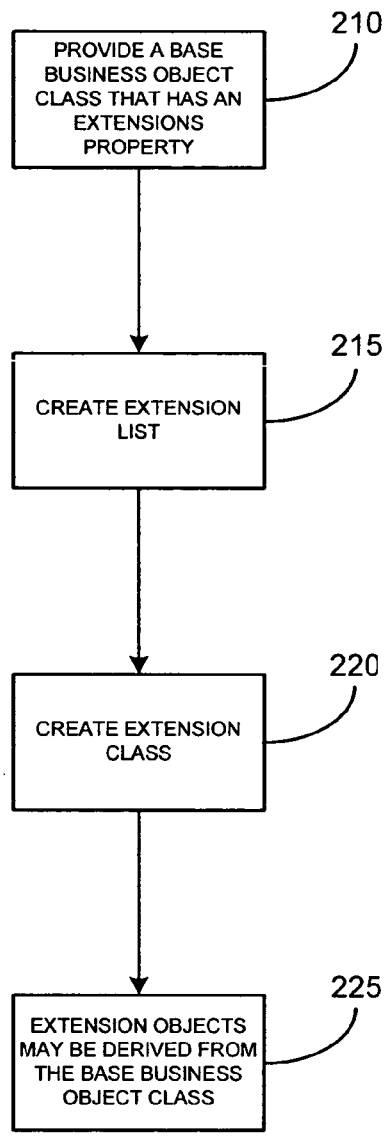
FIG. 2 is a flowchart of a possible embodiment of a method of designing an extensible base business object in accordance with the claims.

FIG. 2 may be an illustration of a method of designing an extensible base business object for a business software system. The business software system may be modifiable by the user. For example, a hospital may desire different information about a client than a car repair business and the business software may be customized to accommodate both users. The software may be operated remotely such as over the internet. Even operating the system remotely, the system still has to be able to accommodate all different types of users.

A possible solution is to make the web service extendible. An extendible web service may require several additions before it is released as a web service. Some possible additions may be:

The schemas for business objects may be designed to be extendible;

The schema for business objects and its extensions may be serialized and de-serialized independently;

An event model may be created to allow subscribers to listen to business events;

The business logic may be put into a series of strategies that are subscribers to the business events; and The business strategies may be late bound so that they may be configured.

Figure 3:
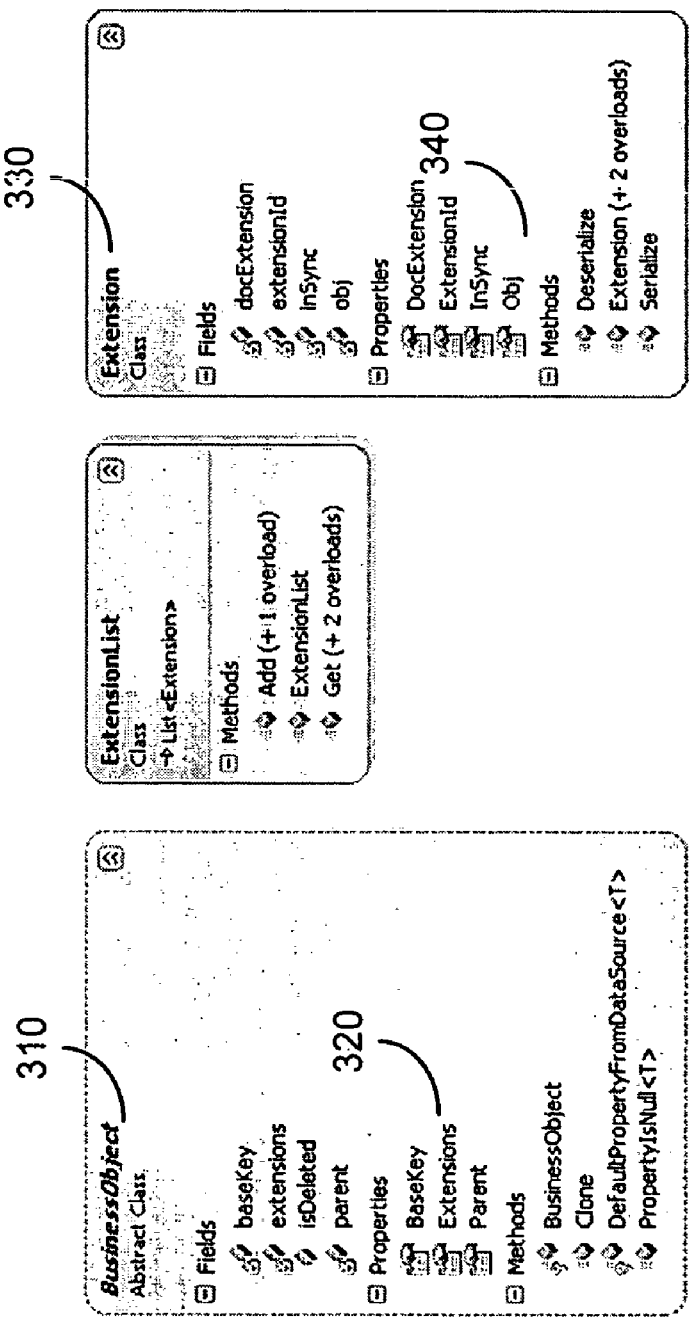
FIG. 3 is an illustration of the extensions used by the method.

Extendible Business Object:

At block 210, the method may provide a base business object class that has an extensions property. All business objects may use the same base type. Examples of business objects include customer, invoices, orders, vendor, etc. By having each business object derive from the base business object class, each business object may be extended. FIG. 3 may be a graphical illustration of the concept of making the business object extensible. A sample business object may be illustrated at 310.

The extensions property may be an extension list 215. Multiple extensions may be permitted. The extensions property of the base business object may be illustrated in FIG. 3 at element 320.

The extension list may include extension classes 220. The extension class contains an extension object and a XML serialized version of the extension object. The extension class may be illustrated as element 330 in FIG. 3. As a result, the schemas will stay the same but the extensions may change and grow.

At block 225, extension objects may be derived from the base business object class.

Serialize and De-Serialized

An xml document may be de-serialized into a business object and a business object instance may be serialized into an xml document with a standard XML serializer. In order to allow complete customization of business objects, the customizations may need to be held as untyped objects and XML elements because the type of the customization may not be known. As the types of the customization may not be known, the traditional XML serializers cannot deserialize them into the correct type. Therefore, in order to perform de-serialization on the type it could be discovered or the customizer could provide the extension type to the ExtensionList Get method.

Figure 4:
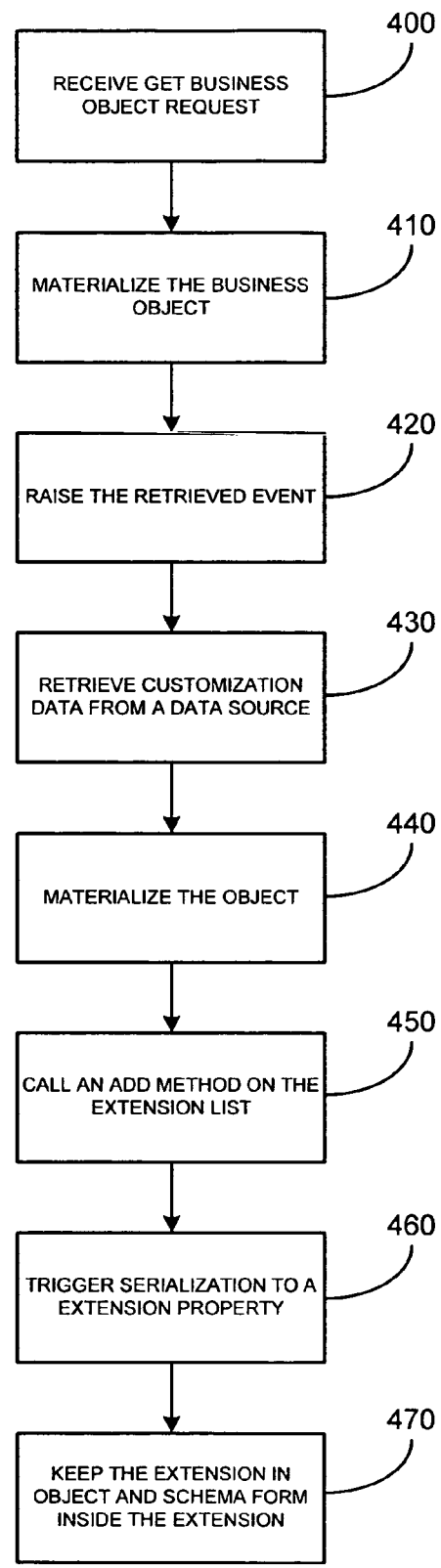
FIG. 4 is an illustration of a possible add method.

FIG. 4 may be an illustration of a possible add method. At block 400, the method may begin when a get business object request is received. At block 410, the method may materialize the business object. At block 420, the method may raise the retrieved event. At block 430, the method may retrieve customization data from a data source. At block 440, the method may materialize the object. At block 450, the method may call an add method on the extension list and at block 460, the method may trigger serialization to an extension property such as Extension.DocExtension. At block 470, the method may keep the extension in object and schema form inside the extension. Accordingly, when the serializer is called or invoked to serialize the business object, the extensions are already serialized inside the extension property (Extension.DocExtension) and the object representation is ignored and does not exist in the schema form. When the customized schema comes back into service, the standard serializer will de-serialize the business object and the Extensions may be held in XML form until they are needed.

Figure 5:
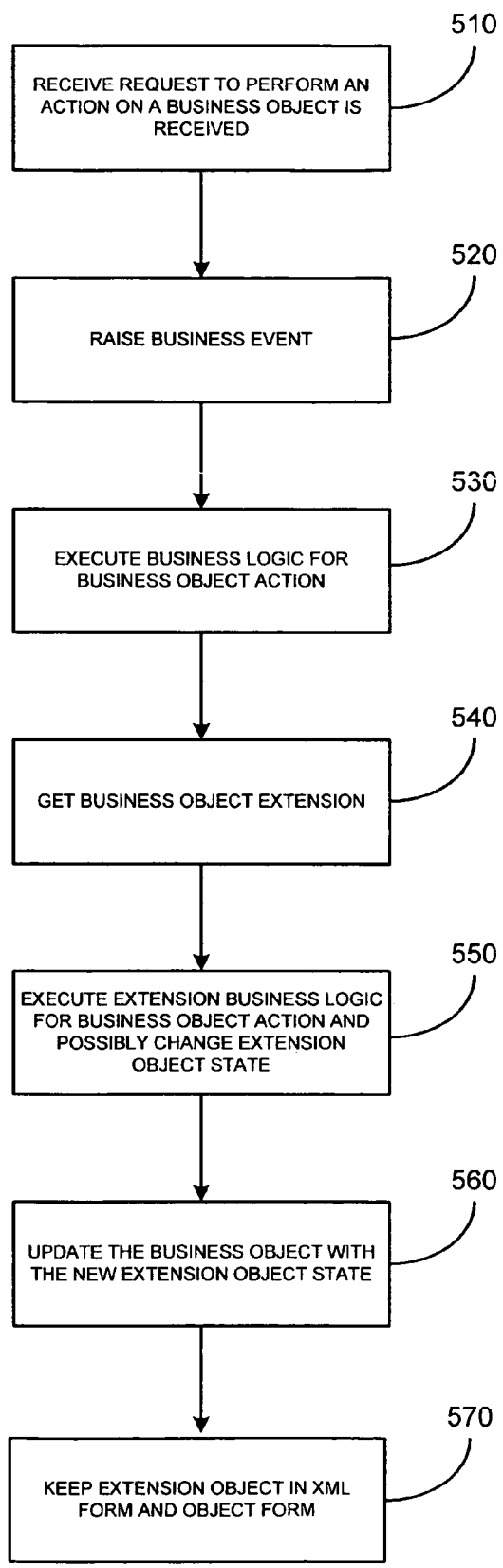
FIG. 5 is an illustration of a possible get method and possible update method.

FIG. 5 may be an illustration of a get method and update method. The method may begin at block 510 when an action is requested to be performed on a business object. At block 520, the method may raise a business event. At block 530, the method may execute business logic for the business object action. At block 540, the method may get an extension object by calling the Extension List Get method triggering de-serialization of the extension property (Extension.DocExtension). At block 550, the method may execute extension business logic and possibly change its state. At block 560, the method may update the business object with the new extension state by setting the Obj property 340 (FIG. 3) on the Extension triggering serialization to an extension property such as Extension.DocExtension. At block 570, the method may keep the extension in object and xml form inside the extension.

Event Model

Figure 6:
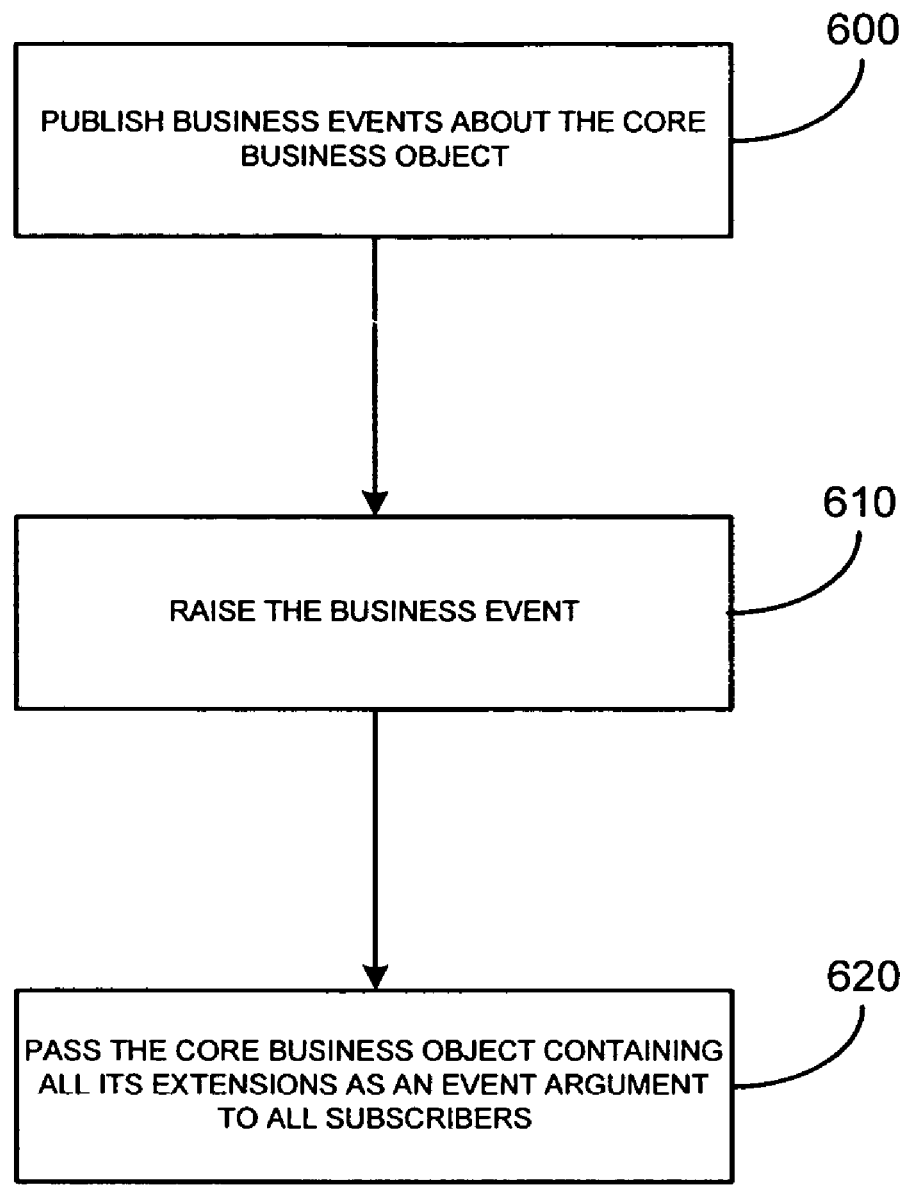
FIG. 6 is an illustration of an event model.

The event model may have various business events to keep subscribers informed when changes are occurring and after they have occurred and allow extensions to participate in business events. FIG. 6 may be an illustration of a possible flow diagram of how the event model may operate.

At block 600, the method may publish business events to subscribers by publishing business events about the core business object. At block 610, the method may raise the business event. At block 620, the method may pass the core business object containing all its extensions as an event argument to all subscribers.

To assist in the event publishing, several events may be provided. A retrieve event may be raised after the core business object has been materialized and is passed to the subscribers where each subscriber would materialize their extension objects and add them to the core business object so that the core business object and all its extensions would be retrieved together. A business event may be raised which corresponds to the business action being performed. This event allows all the subscribers to perform the action too. Some sample actions may be defaulting, validating, creating, updating, deleting, posting and voiding.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of providing a modifiable, extendable web service for a remotely accessible business software system comprising:

storing, in computer-readable storage media of all computing devices of the remotely accessible business software system, computer-executable instructions for a schema for the modifiable, extendable web service, the schema including a base business object class, wherein:

the base business object class includes an extensions property, the extensions property is defined by an extensions list, the extensions list includes zero or more extension classes, each of the extension classes includes an extension object, an XML serialized version of the extension object, and an extension object property, the extension object is derived from the base business object class, a serialization of a base business object of the base business object class and a serialization of each extension object corresponding to the base business object are performed independently in time, and a de-serialization of the base business object and a de-serialization of the each extension object corresponding to the base business object are performed independently in time;

by a first computing device of the remotely accessible business software system, retrieving a particular extension object of a particular extension class of a particular base business object of the base business object class, the particular base business object being customized with the particular extension object, wherein the step of retrieving comprises:

first, receiving a request for an action to be performed on the particular base business object;

second, raising a first business event corresponding to the request;

third de-serializing the particular base business object;

fourth, executing base business logic corresponding to the action and to the particular base business object;

fifth, calling an extensions-list-get-method to trigger de-serialization of a particular extensions property of the base business object class and to obtain the particular extension object;

sixth, executing extension business logic corresponding to the action and to the particular extension object, and changing an extension state of the particular extension object;

seventh, updating the particular base business object with the extension state of the particular extension object by setting a particular extension object property corresponding to the particular extension object to trigger serialization of the particular extension object property; and eighth, maintaining the particular extension object and an XML serialized version of the particular extension object in the particular extension class; and by the first computing device, publishing a second business event to all subscribers of the second business event, comprising:

materializing a core business object of the base business object class corresponding to the second business event;

raising a retrieve event;

passing the retrieve event to the all subscribers of the second business event;

adding more than one materialized extension objects to the core business object, wherein at least two of the more than one materialized extension objects are each materialized by a different subscriber of the second business event;

raising the second business event; and passing, to the all subscribers of the second business event, the core business object as an event argument, the core business object containing more than one materialized extension objects.

2. The method of claim 1, wherein the extension object included in the schema is one of extensible or not extensible.

3. The method of claim 2, further comprising, at the first computing device, providing access for third parties to review and further extend extensible extensions.

4. The method of claim 1, further comprising, at the first computing device, raising a default event that applies default values for one or more particular extensions object properties of the particular base business object.

5. The method of claim 1, further comprising, at the first computing device, raising a validate event that passes the particular base business object and a validation result to every subscriber.

6. The method of claim 5, wherein the validation result includes all errors and warnings to ensure that the particular base business object is in a valid state.

7. The method of claim 6, wherein if problems are encountered, a comprehensive list corresponding to the problems is returned to a consumer of the particular base business object.

8. The method of claim 1, further comprising, at the first computing device, notifying other business objects that the particular base business object is changing.

9. The method of claim 1, further comprising, at the first computing device, notifying other business objects that the particular base business object has changed.

10. A computer readable storage medium configured to store computer executable instructions, for providing a modifiable, extendable web service for a remotely accessible business software system the computer executable instructions including instructions for:

storing a schema for the modifiable, extendable web service, the schema including a base business object class, wherein:

the base business object class includes an extensions property, the extensions property is defined by an extensions list, the extensions list includes zero or more extension classes, each of the extension classes includes an extension object, an XML serialized version of the extension object, and an extension object property, the extension object is derived from the base business object class, a serialization of a base business object of the base business object class and a serialization of each extension object corresponding to the base business object are performed independently in time, and a de-serialization of the base business object and a de-serialization of the each extension object corresponding to the base business object are performed independently in time;

retrieving a particular extension object of a particular extension class of a particular base business object of the base business object class, the particular base business object being customized with the particular extension object, wherein the step of retrieving comprises:

first, receiving a request for an action to be performed on the particular base business object;

second, raising a first business event corresponding to the request;

third, de-serializing the particular base business object;

fourth, executing base business logic corresponding to the action and to the particular base business object;

fifth, calling an extensions-list-get-method to trigger de-serialization of a particular extensions property of the base business object class and to obtain the particular extension object;

sixth, executing extension business logic corresponding to the action and to the particular extension object, and extension state of the particular extension object;

seventh, updating the particular base business object with the extension state of the particular extension object by setting a particular extension object property corresponding to the particular extension object to trigger serialization of the particular extension object property; and eighth, maintaining the particular extension object and an XML serialized version of the particular extension object in the particular extension class; and publishing a second business event to all subscribers of the second business event, comprising:

materializing a core business object of the base business object class corresponding to the second business event;

raising a retrieve event;

passing the retrieve event to the all subscribers of the second business event;

adding more than one materialized extension objects to the core business object, wherein at least two of the more than one materialized extension objects are each materialized by a different subscriber of the second business event;

raising the second business event; and passing, to the all subscribers of the second business event, the core business object as an event argument, the core business object containing the more than one materialized extension objects.

11. A computer system comprising a processor capable of executing computer executable code, a memory capable of storing the computer executable code, and an input/output circuit where the processor is programmed to execute the computer executable code for providing a modifiable, extendable service for a remotely accessible business software system, the computer executable code comprising code for:

storing a schema for the modifiable, extendable web service, the schema including a base business object class, wherein:

the base business object class includes an extensions property, the extensions property is defined by an extensions list, the extensions list includes zero or more extension classes, each of the extension classes includes an extension object, an XML serialized version of the extension object, and an extension object property, the extension object is derived from the base business object class, a serialization of a base business object of the base business object class and a serialization of each extension object corresponding to the base business object are performed independently in time, and a de-serialization of the base business object and a de-serialization of the each extension object corresponding to the base business object are performed independently in time;

retrieving a particular extension object of a particular extension class of a particular base business object of the base business object class, the particular base business object being customized with the particular extension object, wherein the step of retrieving comprises:

first, receiving a request for an action to be performed on the particular base business object;

second, raising a first business event corresponding to the request;

third, de-serializing the particular base business object;

fourth, executing base business logic corresponding to the action and to the particular base business object;

fifth, calling an extensions-list-get-method to trigger de-serialization of a particular extensions property of the base business object class and to obtain the, particular extension object;

sixth, executing extension business logic corresponding to the action and to the particular extension object, and changing an extension state of the particular extension object;

seventh, updating the particular base business object with the extension state of the particular extension object by setting a particular extension object property corresponding to the particular extension object to trigger serialization of the particular extension object property; and eighth, maintaining the particular extension object and an XML serialized version of the particular extension object in the particular extension class; and publishing a second business event to all subscribers of the second business event, comprising;

materializing a core business object of the base business object class corresponding to the second business event;

raising a retrieve event;

passing the retrieve event to the all subscribers of the second business event;

adding more than one materialized extension objects to the core business object, wherein at least two of the more than one materialized extension objects are each materialized by a different subscriber of the second business event;

raising the second business event; and passing, to the all subscribers of the second business event, the core business object as an event argument, the core business object containing the more than one materialized extension objects.

12. The method of claim 1, wherein calling the extensions-list-get-method to trigger de-serialization comprises discovering a type of customization corresponding to the particular extensions object or receiving the type of customization provided by a customizer of the particular base business object.

13. The computer readable storage medium of claim 10, wherein calling the extensions-list-get-method to trigger de-serialization comprises discovering a type of customization corresponding to the particular extensions object or receiving the type of customization provided by a customizer of the particular base business object.

14. The computer system of claim 11, wherein calling the extensions-list-get-method to trigger de-serialization comprises discovering a type of customization corresponding to the particular extensions object or receiving the type of customization provided by a customizer of the particular base business object.

* * * * *

UNITED STATES PATENT AND TRADEMARK OFFICE
CERTIFICATE OF CORRECTION

| | | |
|---|---|---|
| PATENT NO. | : 7,694,279 B2 | Page 1 of 1 |
| APPLICATION NO. | : 11/363126 | |
| DATED | : April 6, 2010 | |
| INVENTOR(S) | : Mark Skunberg et al. | |

It is certified that error appears in the above-identified patent and that said Letters Patent is hereby corrected as shown below:

In column 8, line 20, in Claim 10, delete "system" and insert -- system, --, therefor.

In column 10, line 6, in Claim 11, delete "the," and insert -- the --, therefor.

In column 10, line 22, in Claim 11, delete "comprising;" and insert -- comprising: --, therefor.

Signed and Sealed this
Twenty-fifth Day of January, 2011

David J. Kappos
*Director of the United States Patent and Trademark Office*